(12) United States Patent
Tokuyama et al.

(10) Patent No.: US 6,324,309 B1
(45) Date of Patent: Nov. 27, 2001

(54) IMAGE PROCESSING APPARATUS

(75) Inventors: Mitsuru Tokuyama, Kyoto;
Masatsugu Nakamura, Kashiba;
Mihoko Tanimura, Nara; Masaaki Ohtsuki, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/102,379

(22) Filed: Jun. 23, 1998

(30) Foreign Application Priority Data

Jun. 27, 1997 (JP) .................................................. 9-172556

(51) Int. Cl.[7] ....................................................... G06K 9/32
(52) U.S. Cl. ........................ 382/300; 382/173; 382/279; 358/525
(58) Field of Search .................................. 382/300, 173, 382/279, 299, 175, 176, 254, 258, 260, 265, 266, 276, 298; 358/534, 535, 536, 455, 428, 525, 528

(56) References Cited

U.S. PATENT DOCUMENTS

| 5,280,546 | * | 1/1994 | Machida et al. | 382/47 |
|---|---|---|---|---|
| 5,361,142 | * | 11/1994 | Semasa | 358/455 |
| 5,515,180 | | 5/1996 | Maeda et al. | 358/458 |
| 5,548,663 | * | 8/1996 | Sekine et al. | 382/164 |
| 5,608,824 | * | 3/1997 | Shimizu et al. | 382/276 |
| 5,696,842 | * | 12/1997 | Shirasawa et al. | 382/176 |
| 5,748,794 | | 5/1998 | Maeda et al. | 382/251 |
| 5,953,463 | * | 9/1999 | Tanaka et al. | 382/298 |
| 5,963,342 | * | 10/1999 | Hirabayashi | 358/456 |

FOREIGN PATENT DOCUMENTS

| 0389164 | 9/1990 | (EP) . |
|---|---|---|
| 0407213 | 1/1991 | (EP) . |
| 0645736 | 3/1995 | (EP) . |
| 1137378 | 5/1989 | (JP) . |
| 5135165 | 6/1993 | (JP) . |
| 766976 | 3/1995 | (JP) . |
| 9016034 | 12/1990 | (WO) . |

* cited by examiner

Primary Examiner—Leo Boudreau
Assistant Examiner—Kanji Patel

(57) ABSTRACT

An image processing apparatus includes a pixel number transforming section for processing input image data composed of a plurality of regions, each being represented by a plurality of pixels with a pixel number transformation, by performing an interpolation or a decrimation on a pixel. It further includes a region decision value extracting section for extracting a region decision value of a region that a target pixel belongs to, based on characteristic amounts representing characteristics of a block composed of the target pixel and a plurality of pixels around the target pixel, each pixel of the image data being considered to be the target pixel. A controller controls a sequential order of a filtering process and pixel number transformation process to be applied to a region, based upon the transformation increasing or reducing a number of pixels in a region. Finally, a region decision value transforming section is included for calculating a region decision value of each region processed with the pixel number transforming process by an interpolation or a decrimation of the region decision value as extracted from the input image data.

25 Claims, 19 Drawing Sheets

FIG.9(a)

| 0 | -1/6 | 0 |
|---|---|---|
| -1/6 | 10/6 | -1/6 |
| 0 | -1/6 | 0 |

| p 1 | p 2 | p 3 |
|---|---|---|
| p 4 | p 5 | p 6 |
| p 7 | p 8 | p 9 |

FIG. 10

| SELECTION SIGNAL / REGION DECISION VALUE | 0 (PIXEL NUMBER INCREASING PROCESS) | 1 (PIXEL NUMBER DECREASING PROCESS) |
|---|---|---|
| 0 (PHOTOGRAPH REGION) | F2:<br>0　0　0<br>0　1　0<br>0　0　0 | F2:<br>0　0　0<br>0　1　0<br>0　0　0 |
| 1 (CHARACTER REGION) | F1:<br>0　-1/6　0<br>-1/6　10/6　-1/6<br>0　-1/6　0 | F3:<br>0　-1/16　0<br>-1/16　20/16　-1/16<br>0　-1/16　0 |
| 2 (SCREEN REGION) | F2:<br>0　0　0<br>0　1　0<br>0　0　0 | F4:<br>1/18　1/18　1/18<br>1/18　10/18　1/18<br>1/18　1/18　1/18 |

FIG.11

| ADDRESS (INPUT VALUE) | 0 | 1 | 2 | 3 | 4 | 5 | 6 | 7 | 8 | 9 | 10 | 11 | 12 | 13 | 14 | 15 (OUTPUT VALUE) |
|---|---|---|---|---|---|---|---|---|---|---|---|---|---|---|---|---|
| 0 | 0 | 2 | 4 | 6 | 8 | 10 | 12 | 14 | 16 | 18 | 20 | 22 | 24 | 26 | 28 | 30 |
| 16 | 32 | 34 | 36 | 38 | 40 | 42 | 44 | 46 | 48 | 50 | 52 | 54 | 56 | 58 | 60 | 62 |
| 32 | 64 | 66 | 68 | 70 | 72 | 74 | 76 | 78 | 80 | 82 | 84 | 86 | 88 | 90 | 92 | 94 |
| 48 | 96 | 98 | 100 | 102 | 104 | 106 | 108 | 110 | 112 | 114 | 116 | 118 | 120 | 122 | 124 | 126 |
| 64 | 128 | 130 | 132 | 134 | 136 | 138 | 140 | 142 | 144 | 146 | 148 | 150 | 152 | 154 | 156 | 158 |
| 80 | 160 | 162 | 164 | 166 | 168 | 170 | 172 | 174 | 176 | 178 | 180 | 182 | 184 | 186 | 188 | 190 |
| 96 | 192 | 194 | 196 | 198 | 200 | 202 | 204 | 206 | 208 | 210 | 212 | 214 | 216 | 218 | 220 | 222 |
| 112 | 224 | 226 | 228 | 230 | 232 | 234 | 236 | 238 | 240 | 242 | 244 | 246 | 248 | 250 | 252 | 254 |
| 128 | 255 | 255 | 255 | 255 | 255 | 255 | 255 | 255 | 255 | 255 | 255 | 255 | 255 | 255 | 255 | 255 |
| 144 | 255 | 255 | 255 | 255 | 255 | 255 | 255 | 255 | 255 | 255 | 255 | 255 | 255 | 255 | 255 | 255 |
| 160 | 255 | 255 | 255 | 255 | 255 | 255 | 255 | 255 | 255 | 255 | 255 | 255 | 255 | 255 | 255 | 255 |
| 176 | 255 | 255 | 255 | 255 | 255 | 255 | 255 | 255 | 255 | 255 | 255 | 255 | 255 | 255 | 255 | 255 |
| 192 | 255 | 255 | 255 | 255 | 255 | 255 | 255 | 255 | 255 | 255 | 255 | 255 | 255 | 255 | 255 | 255 |
| 208 | 255 | 255 | 255 | 255 | 255 | 255 | 255 | 255 | 255 | 255 | 255 | 255 | 255 | 255 | 255 | 255 |
| 224 | 255 | 255 | 255 | 255 | 255 | 255 | 255 | 255 | 255 | 255 | 255 | 255 | 255 | 255 | 255 | 255 |
| 240 | 255 | 255 | 255 | 255 | 255 | 255 | 255 | 255 | 255 | 255 | 255 | 255 | 255 | 255 | 255 | 255 |

FIG.15

| 1/11 | 1/11 | 1/11 | ⸺ F 5 |
|---|---|---|---|
| 1/11 | 3/11 | 1/11 | |
| 1/11 | 1/11 | 1/11 | |

FIG. 16

| REGION DECISION VALUE | RESTORING FILTER |
|---|---|
| 0 (PHOTOGRAPH REGION) | F5: <table>1/11, 1/11, 1/11 / 1, 3, 1/11 / 1/11, 1/11, 1/11</table> |
| 1 (CHARACTER REGION) | F2: <table>0, 0, 0 / 0, 1, 0 / 0, 0, 0</table> |
| 2 (SCREEN REGION) | F4: <table>1/18, 1/18, 1/18 / 1/18, 10/18, 1/18 / 1/18, 1/18, 1/18</table> |

FIG.19(a)

| -1 | 0 | 1 |
|----|---|---|
| -1 | 0 | 1 |
| -1 | 0 | 1 |

FIG.19(b)

| p 1 | p 2 | p 3 |
|-----|-----|-----|
| p 4 | p 5 | p 6 |
| p 7 | p 8 | p 9 |

FIG.22(a)

| 0 | -1/6 | 0 |
|---|---|---|
| -1/6 | 10/6 | -1/6 |
| 0 | -1/6 | 0 |

FIG.22(b)

| 0 | -1/10 | 0 |
|---|---|---|
| -1/10 | 14/10 | -1/10 |
| 0 | -1/10 | 0 |

FIG.22(c)

| 0 | -1/16 | 0 |
|---|---|---|
| -1/16 | 20/16 | -1/16 |
| 0 | -1/16 | 0 |

FIG.22(d)

| 0 | -1/26 | 0 |
|---|---|---|
| -1/26 | 30/26 | -1/26 |
| 0 | -1/26 | 0 |

FIG.22(e)

| 0 | 0 | 0 |
|---|---|---|
| 0 | 1 | 0 |
| 0 | 0 | 0 |

FIG 22(f)

| 0 | 0 | 0 |
|---|---|---|
| 0 | 1 | 0 |
| 0 | 0 | 0 |

IMAGE PROCESSING APPARATUS

FIELD OF THE INVENTION

The present invention relates to an image processing apparatuses for use in scanners, digital copying machines, facsimiles, etc., designed for processing image data obtained by scanning a document image, the image data being composed of a plurality of regions (for example, character region, photographic region and screen region), each being represented by a plurality of pixels. The image processing apparatuses processes the image data with a pixel number transformation by performing an interpolation or a discrimination on a pixel and recognizing each region of the image data to process the image data according to each region so as to output a magnified or resolution-converted document image.

BACKGROUND OF THE INVENTION

Conventionally, image processing apparatuses have been known for processing an image of a mixed type of a line image region and an halftone image region by identifying a line image region and a halftone image region based on a feature amount of the image in a vicinity of a target pixel to be processed to process the image in the line image region in a different manner from the image in the halftone region.

The described image processing apparatuses are disclosed in, for example, Japanese Unexamined Patent Publication No 137378/1989 (Tokukaihei 1-137378) which includes space filtering devices for space-filtering an image input in which a line image region and a tone image region are mixed; binarization devices for binarizing an output from the space filtering device, wherein a feature amount of an image in a vicinity of a target pixel to be processed is extracted so as to switch the space filtering device and the binarizing device based on the feature amount as being extracted, and the space filtering device and the binarizing device are switched based on the feature amount as extracted. Furthermore, according to the image processing device of the described publication, as shown in FIG. 1, of the described publication the device for binarizing the feature amount extraction data is switched to a multiplexer provided in a pre-stage.

However, the described image processing device does not take the variable magnification process of resolution conversion into consideration both in the device for extracting the feature amount and the device for altering the binarizing device based on the result of extraction of the feature amount. Namely, the image processing device is arranged so as to perform a predetermined image process irrespectively of the magnification factor or the resolution conversion factor.

Furthermore, the image processing apparatus cannot be applied to the processing of the image after the magnification process or the resolution conversion as the apparatus is not provided with a circuit for carrying out a magnification process or a resolution conversion process of feature extraction data. Therefore, in the described image processing apparatus, segmentation of the image data processed with the magnification process or the resolution conversion cannot be performed with high precision in consideration of the magnification factor or the resolution conversion factor. For the above reasons, the image processing apparatus has a drawback in that the filtering process of the binairizing process after the magnification or the resolution conversion are lowered, which causes a degrading of a quality of the resulting processed image.

SUMMARY OF THE INVENTION

It is an object of the present invention to provide an image processing apparatus which permits an improved quality of an image by segmenting image data processed with a pixel number transforming process with high precision.

In order to achieve the above object, the image processing apparatus of the present invention is characterized by including:

pixel number transforming means for processing input image data composed of a plurality of regions each being represented by a plurality of pixels with a pixel number transformation by performing an interpolation or a decrimation on a pixel;

region decision value extraction means for extracting a region decision value of a region a target pixel belongs to based on characteristic amounts representing characteristics of a block composed of the target pixel and a plurality of pixels around the target pixel, each pixel of the image data being considered to be the target pixel; and region decision value transforming means for calculating a region decision value of each pixel processed with the pixel number transformation by performing an interpolation or a decrimation on the region decision value as extracted from the input image data.

According to the described arrangement, the region decision value transforming means processes the region decision value as extracted from the input image data by the region decision value extraction means by performing an interpolation or a decrimation on the region decision value, to obtain the region decision value of each pixel of the input image data processed with the pixel number transformation. As this permits the region segmentation image processing means to segment the image data into a plurality of regions as processed with the pixel number transformation with high precision, an optimal image process can be applied for each region (for example, filtering process, γ-transformation, pseudo-halftone process, editing process and quantization-restoring process, etc.). Therefore, an improved quality of the image processed with the pixel number transformation process can be achieved.

For a fuller understanding of the nature and advantages of the invention, reference should be made to the ensuing detailed description taken in conjunction with the accompanying drawings.

BRIEF DESCRIPTION OF THE DRAWINGS

FIG. 9(a) and FIG. 9(b) are explanatory views explaining the filtering process in the filter processing section of the image processing apparatus, wherein FIG. 9(a) shows a filter, and FIG. 9(b) shows image data;

FIG. 10 is an explanatory view showing a filter for use in each region of the filter processing section;

FIG. 11 is an explanatory view showing one example of a lookup table for use in an γ-transformation section of the image processing apparatus;

FIG. 15 is an explanatory view showing one example of a restoration filter for use in the quantization-restoring section of the image processing apparatus;

FIG. 16 is an explanatory view showing a restoration filter for use in each region of the quantization restoring section of the image processing apparatus;

FIG. 17(a) and FIG. 17(b) are explanatory views for a screening process to be carried out by a quantization restoring section of the image processing device, wherein FIG. 17 shows a screening pattern, and FIG. 17(b) shows image data;

FIG. 19(a) and FIG. 19(b) are explanatory views for explaining an edge detecting method for use in the region decision value extracting section of the image processing apparatus, wherein FIG. 19(a) shows a sober filter for use in detecting an edge, and FIG. 19(b) shows image data;

FIGS. 22(a) through (f) are explanatory views respectively showing coefficients of filters for use in processing based on the sober output.

DESCRIPTION OF THE EMBODIMENTS

The following descriptions will discuss one embodiment of the present invention in reference to figures.

Figure 1:
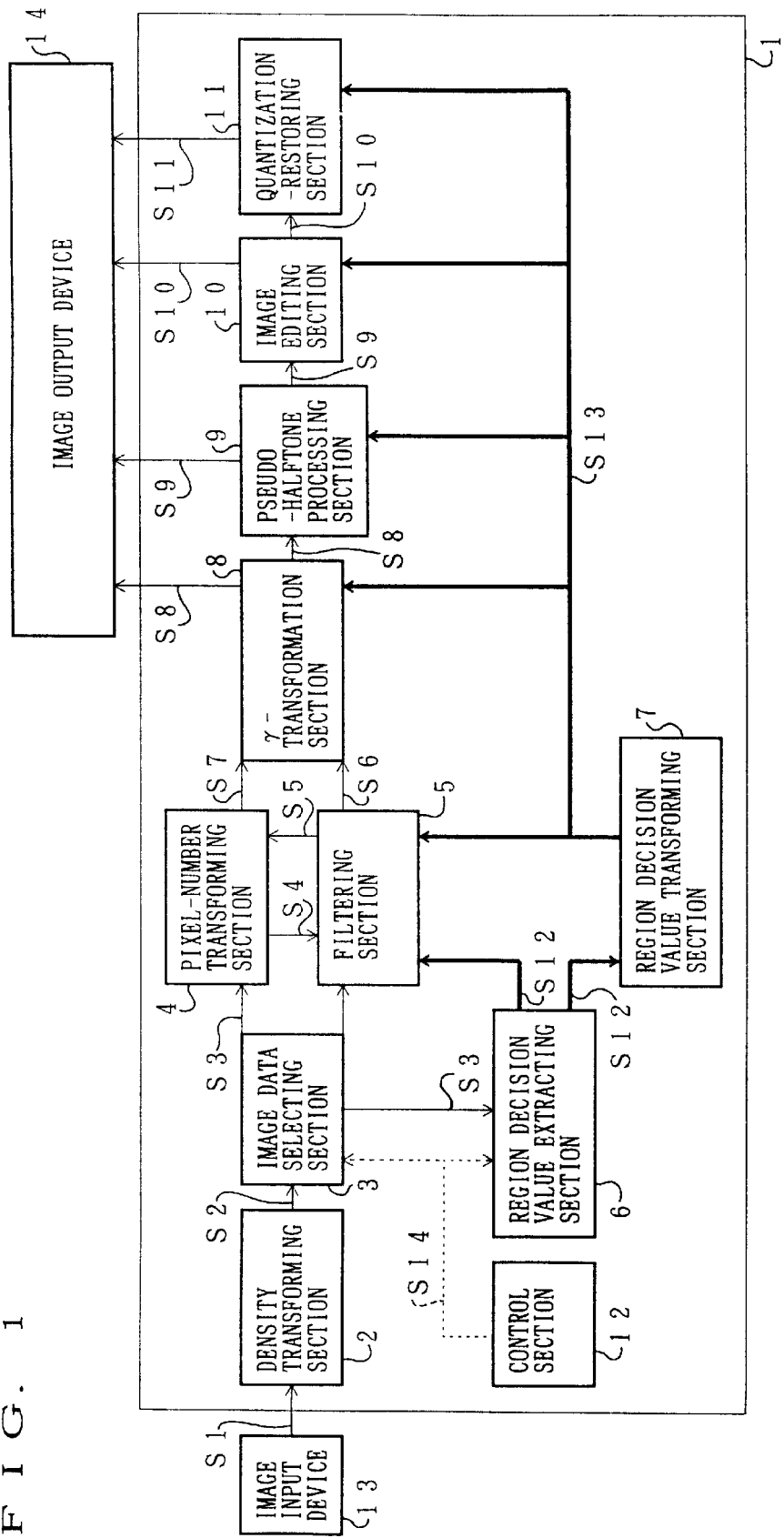
FIG. 1 is a block diagram showing a structure of an image processing apparatus in accordance with one embodiment of the present invention.

As shown in FIG. 1, an image processing apparatus 1 in accordance with the present embodiment is arranged so as to process a document image in which a character region, a photographic region and a screen region are mixed, wherein a pixel number transformation is applied to an image data obtained by reading the document image with a resolution ($R_{IN}$) of 400 dpi and 256 gray scale, and the image data as processed are output to an image output device 14 having a resolution ($R_{OUT}$) of 600 dpi. In the image processing device 1, the magnification factor (Z) indicative of a ratio of an image to be printed out by the image output device 14 to the document image can be adjusted within a range of from 50 to 200% (from 0.5 to 2.0).

An image input device 13 of the present embodiment is not particularly limited as long as the image as read can be output as image data of various pixel density values. In the present embodiment, a scanner wherein using a CCD (Charge Coupled Device) as the image input device 13, a reflected light of the document image is focused on the CCD by optical lens, and an analog output of the CCD is converted into a digital output.

The image input device 13 has a function of a shading correction wherein image data are corrected so as to maintain a constant pixel output when picking up the image data on a normal white board. The image input device 13 outputs the image data DATA 1 to which the shading correction is applied to a density transforming section 2 (to be described later) of the image processing apparatus 1.

As shown in the block diagram of FIG. 1, the image processing device 1 of the present embodiment includes the density transforming section 2, an image data selecting section 3, a pixel-number transforming section (pixel-number transforming means) 4, a filtering section (region segmentation image processing means, region segmentation filtering means) 5, a region decision value extracting section (region decision value extracting means) 6, a region decision value transforming section (region decision value transforming means) 7, a γ-transformation section (region segmentation image processing means) 8, a pseudo-halftone processing section (region segmentation image processing means) 9, an image editing section (region segmentation image processing means) 10, a quantization-restoring section (region segmentation image processing means) 11, and a control section (control means) 12.

First, the structure of each section of the image processing apparatus 1 will be briefly explained along the flow of signals of image data and region segmentation data, etc.

The density transforming section 2 is provided for applying a density conversion with respect to the image data "S1" as input by the image input device 13 and send the resulting image data "S2" to the image data selecting section 3.

The image data selecting section 3 directly sends the image data "S2" as image data "S3" based on a selection signal "DATA 14" as input from the control section 12 either to the pixel-number transforming section 4 or to the filtering section 5. The image data selecting section 3 also sends the image data "S3" to the region decision value extracting section 6.

There are two flows of the image data from the image data selecting section 3 to the γ-transformation section 8. One is for the pixel number increasing process, i.e., the image data "S3" as sent from the image data selecting section 3 is first converted to image data "S4", and the image data "DATA 4" are output to the γ-transformation section 8 through the filtering section 5. The other flow is for the pixel number reducing process, i.e., image data "DATA 5" as sent from the image data selecting section 3 via the image data "S5" are first subjected to the pixel number reducing process by the pixel-number transforming section 4 to be converted to the image data "S7", and the image data "DATA 7" is set to the γ-transformation section 8.

The region decision value extracting section 6 is provided for sending segmentation data "DATA 12" composed of respective region decision values of pixels as extracted from the image data "S3" to the filtering section 5 or the region decision value transforming section 7 based on the image output device 14 as input from the control section 12.

The region decision value transforming section 7 is provided for converting a region decision value of each pixel of the segmentation data "S12". The region decision value transforming section 7 sends the converted region decision value of each pixel as converted segmentation data "S13" to the filtering section 5, the γ-transformation section 8, the pseudo-halftone processing section 9, the image editing section 10 and the quantization-restoring section 11. Here, the converged region decision value coincides the region decision value of each pixel of the converted image data ("S4 or S7").

Based on the result as selected by the image data selecting section 3, the image data (S6 or S7) processed with the pixel number transforming and filtering process are sent to the γ-transformation section 8 from the pixel-number transforming section 4 or the filtering section 5.

The γ-transformation section 8 is provided for γ-transforming the image data using the converted segmentation data "S13", and the γ-converted image data "S8" are sent to the image output device 14 or the pseudo-halftone processing section 9 based on a control signal (not shown) from the control section 12.

The pseudo-halftone processing section 9 performs a pseudo-halftone process with respect to the image data "S8" as sent from the γ-transformation section 8 using the converted segmentation data "S13" to be image data "S9", and sends the image data "DATA 9" either to the image output device 14 or to the image editing section 10 based on a control signal (not shown) from the control section 12.

With respect to the image data "S9" as received from the pseudo-halftone processing section 9, the image editing section 10 performs an image editing process using the converted segmentation data "DATA 13" if an upgrading of an image quality can be expected by this process. Further, the image editing section 10 sends the image data as processed to the image output device 14 or the quantization-restoring section 11 based on the control signal (not shown) from the control section 12.

The quantization-restoring section 11 decodes the binary image data "S10" processed with the binarization or scale compression process performed by the pseudo-halftone processing section 9 into the high quality image data "DATA 11" using the converted segmentation data "S13". Furthermore, the quantization-restoring section 11 sends the quantized binary image data "S11" to the image output device 14.

Next, the respective sections of the image processing apparatus will be explained in detail.

The density transforming section 2 performs a density conversion of the image data "S1" based on the density conversion table prepared beforehand in consideration of the characteristics of the image input device 13 to attain linear density characteristics with regard to the optical density of the document image. As a result, the density transforming section 2 can send the image data "S2" having linear density characteristics (constant characteristics) with respect to the optical density of the document image irrespectively of the characteristics of the image input device 13.

The control section 12 controls so as to send to the image data selecting section 3 or the region decision value extracting section 6 the selective signal "0" or "1" for use in controlling the flow of the image data as well as the conversion of the region decision value depending on whether the process to be performed by the pixel-number transforming section 4 is the pixel number increasing process or the pixel number decreasing process.

The image data selecting section 3 alters the flow of the image data based on the selection signal "S14" from the control section 12. Specifically, upon receiving a selective signal "0" indicative of a pixel increasing process from the control section 12, the image data selecting section 3 sends the image data "S3" to the pixel-number transforming section 4 so that the image data flows from the pixel-number transforming section 4 to the γ-transformation section 8 via the filtering section 5. On the other hand, upon receiving a selective signal "1" indicative of the pixel number decreasing process from the control section 12, the image data selecting section 3 sends the image data "S3" to the filtering section 5 so that the image data flows from the filtering section 5 to the γ-transformation section 8 via the pixel-number transforming section 4. The image data selecting section 3 also sends the image data "S3" to the region decision value extracting section 6.

As described, the image processing apparatus 1 is arranged such that in the case of applying the pixel number increasing process to the image data, the image data are first subjected to the pixel number transformation by the pixel-number transforming section 4, and then the image data as processed are further subjected to the filtering process by the filtering section 5. Furthermore, the filtering process to be performed after the pixel number increasing process is carried out by the region decision value extracting section 6 using the converted segmentation data "S13" processed with the pixel number increasing process. As a result, an optimal use of segmentation in the filtering process can be achieved.

On the other hand, in the case of applying the pixel number reducing process to the image data, before carrying out the pixel number converting process by the pixel-number transforming section 4, the filtering process is applied by the filtering section 5. As a result, a problem of moire can be eliminated.

The region decision value extracting section 6 computes the maximum density difference and the degree of discreteness in the block (matrix) including the target pixel and the pixels surrounding the target pixel as characteristic amounts for each pixel of the image data S3. Then, the region decision value extracting section 6 identifies to which of the character region, the photographic region or the screen region, the target pixel belongs to based on the segmentation table having these two characteristic amounts as input to obtain the region decision value of the target pixel. Then, the resulting region decision value of each pixel is sent as the segmentation data S12.

Next, the region decision value extracting section 6 will be explained in detail.

First, the region decision value extracting section 6 calculates for each pixel of the image data "S3" a maximum density $D_{max}$ and a minimum density $D_{min}$ in a block (matrix) of 5×5 including a target pixel P and 24 pixels surrounding the target pixel (pixels in the hatched area of FIG. 2), and the difference between the maximum density $D_{max}$ and a minimum density $D_{min}$ (=$D_{max}$−$D_{min}$) is computed to be maximum density difference of the first feature amount.

Figure 2:
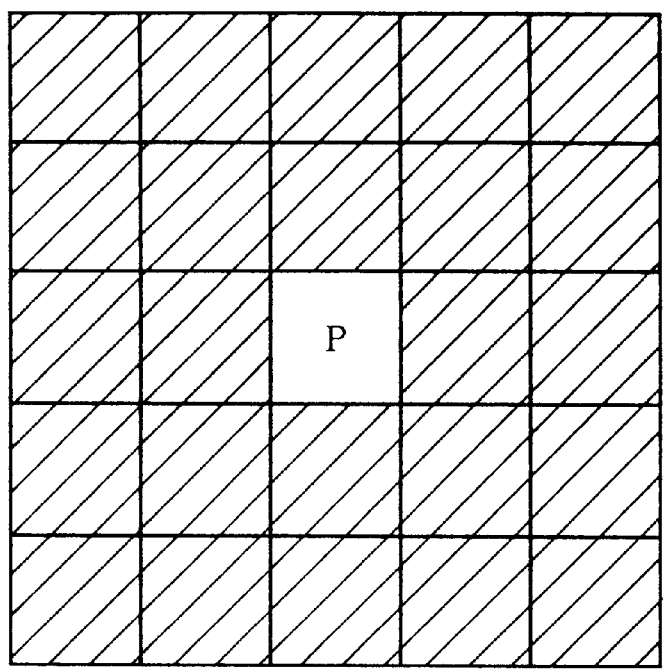
FIG. 2 is an explanatory view showing a block of 5×5 to be adopted for an extraction of a region decision value in the region decision value extracting section of the image processing apparatus.
Figure 3:
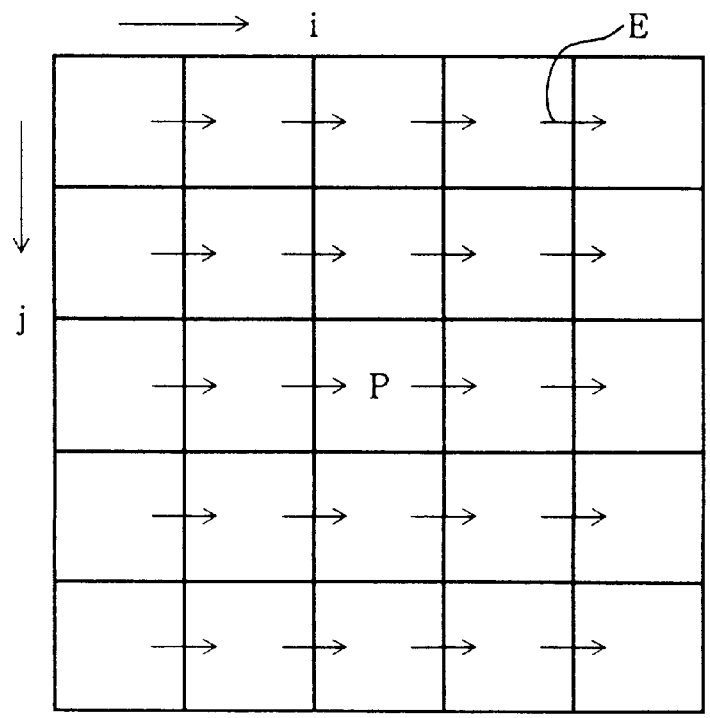
FIG. 3 is an explanatory view explaining a method of computing a frequency in an E-direction of the region decision value extracting section.
Figure 4:
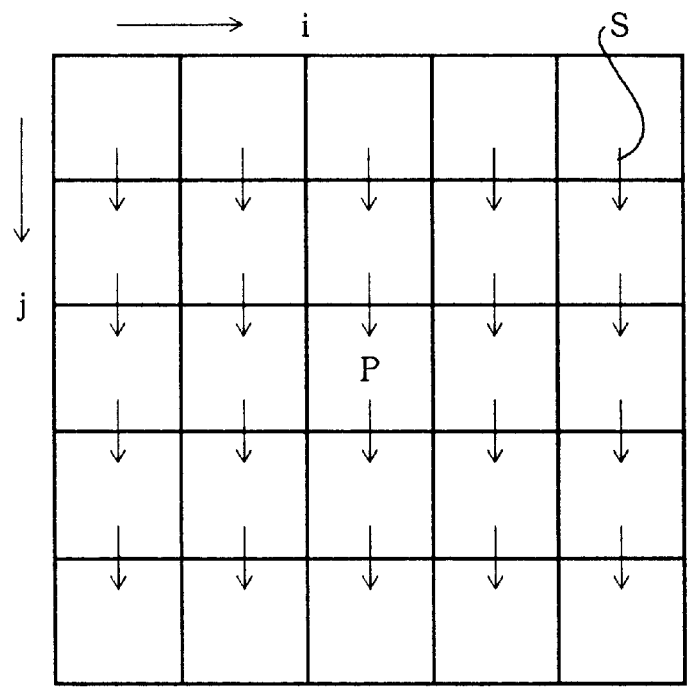
FIG. 4 is an explanatory view explaining a method of computing a frequency in an S-direction of the region decision value extracting section.
Figure 5:
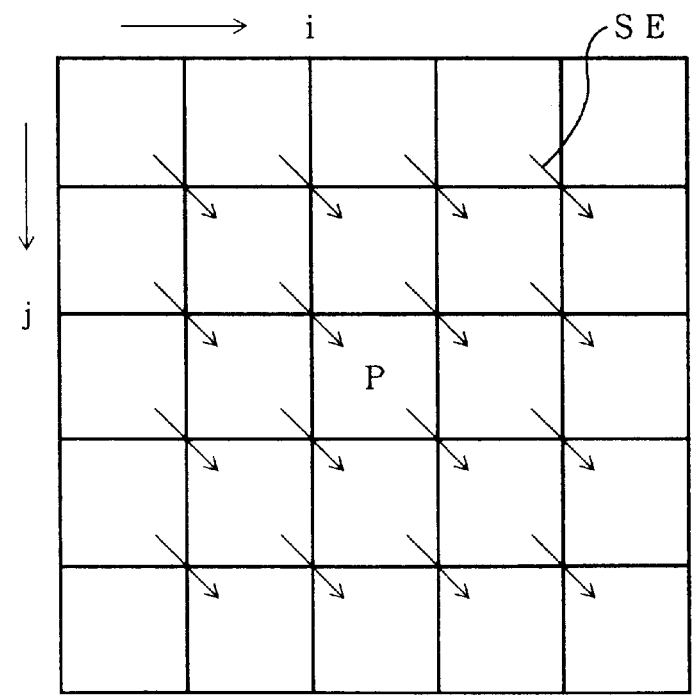
FIG. 5 is an explanatory view explaining a method of computing a frequency in an SE-direction of the region decision value extracting section.

For each pixel of the image data "S3", a degree of discreteness is obtained with respect to four directions of 1) E-direction indicated by an arrow E shown in FIG. 3, 2) S-direction shown in FIG. 4, 3) SE-direction shown by an arrow SE in FIG. 5, and 4) SW-direction shown by an arrow SW. Among the resulting four degrees of discreetness, the minimum degree of discreteness is determined to be the degree of discreteness of the second characteristic amount. FIG. 3 through FIG. 6 in which the same blocks as FIG. 2 are shown all refer to the same 25 pixels.

The method of computing the degree of discreteness will be explained in detail.

First, the degree of discreteness in the E-direction shown in FIG. 3 are obtained in the following manner. For all the combinations of two adjoining pixels in the E-direction (lateral direction) within the block of 5×5 (hereinafter referred to as 5×5 block) composed of the target pixel P and 24 pixels surrounding the target pixel P, a difference (absolute value) in density between pixels is computed, and the sum of the differences is computed, thereby obtaining a degree of discreteness. Therefore, the pixel value within 25 blocks is indicated as p(m, n) by the integer m of from i−2 to i+2 representing an i-axis coordinate of each pixel and an integer n of from j−2 to j+2 representing a j-axis coordinate of each pixel, a degree of discreteness of $C_E$ in the E-direction is shown by the following equation (1).

$$C_E = \sum_{m=i-1}^{i+2} \sum_{n=j-2}^{j+2} |p(m,n) - p(m-1,n)| \quad (1)$$

The degree of discreteness in the S-direction shown in FIG. 4 is obtained in the following manner. For all the combinations of two adjoining pixels in the S-direction (longitudinal direction) within the 5×5 block, a difference (absolute value) in density between pixels is computed, and the sum of the differences is computed, thereby obtaining a degree of discreteness. The degree of discreteness of $C_S$ in the S-direction is shown by the following equation (2).

$$C_S = \sum_{m=i-2}^{i+2} \sum_{n=j-1}^{j+2} |p(m,n) - p(m,n-1)| \quad (2)$$

The degree of discreteness in the SE-direction shown in FIG. 5 are obtained in the following manner. For all the combinations of two adjoining pixels in the SE-direction (longitudinal direction) within the 5×5 block, a difference (absolute value) in density between pixels is computed, and the sum of the differences is computed, thereby obtaining a degree of discreteness. The degree of discreteness of $C_{SE}$ in the SE direction is shown by the following equation (3).

$$C_{SE} = \sum_{m=i-1}^{i+2} \sum_{n=j-1}^{j+2} |p(m,n) - p(m-1,n-1)| \times \alpha \quad (3)$$

Figure 6:
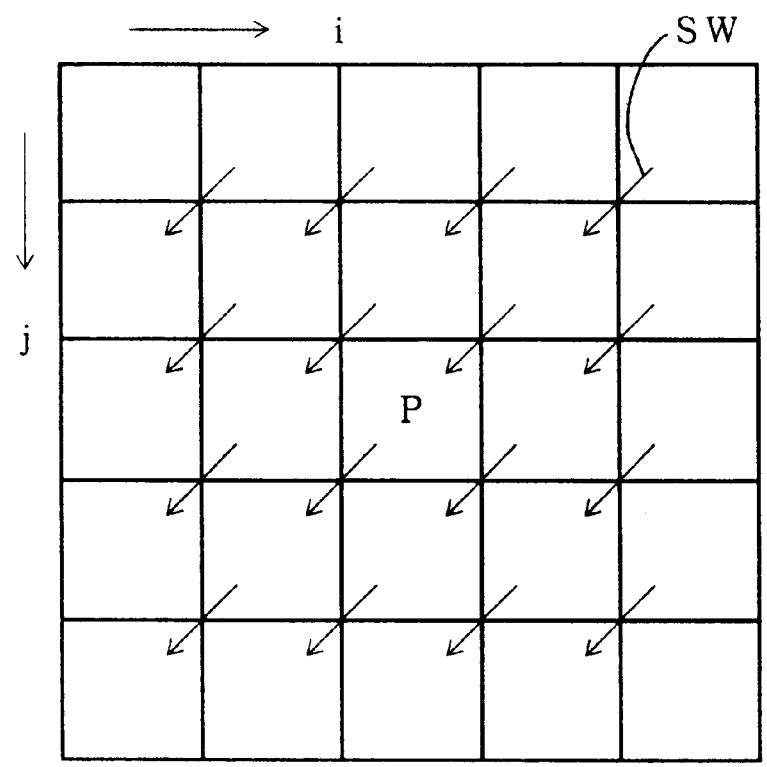
FIG. 6 is an explanatory view for explaining a method of computing a frequency in an SW-direction of the region decision value extracting section.

The degree of discreteness in the SW-direction shown in FIG. 6 is obtained in the following manner. For all the combinations of two adjoining pixels in the SW-direction (longitudinal direction) within the 5×5 block, a difference (absolute value) in density between pixels is computed, and the sum of the differences is computed, thereby obtaining a degree of discreteness. The degree of discreteness of $C_{SW}$ in the SW direction is shown by the following equation (4).

$$C_{SW} = \sum_{m=i-2}^{i+1} \sum_{n=j-1}^{j+2} |p(m,n) - p(m+1,n-1)| \times \alpha \quad (4)$$

In the equation (3) and the equation (4), α in the equation (3) and the equation (4) is the coefficient for use in normalizing a) a sum of differences in the E-direction and in the S-direction (20: which is the number in the direction shown by the arrow E in FIG. 3 or the number shown in an arrow S in FIG. 4) and b) a sum of differences in the SE-direction and in the SW-direction (16 which is the number in the direction shown by the arrow SE in FIG. 5 or the number in the direction SW shown in FIG. 6). In this case, α is determined to be 5/4.

Among the resulting degrees of discreteness in the four directions in the block thus computed, the minimum value is determined to be a degree of discreteness of the target pixel P. Namely, the degree of discreteness $C_P$ of the target pixel P is shown by the following equation.

$$C_P = \min(C_E, C_S, C_{SE} \text{ and } C_{SW}).$$

In the described manner, two types of the feature amounts of each pixel, the maximum density difference and the degree of discreteness, are computed.

Figure 7:
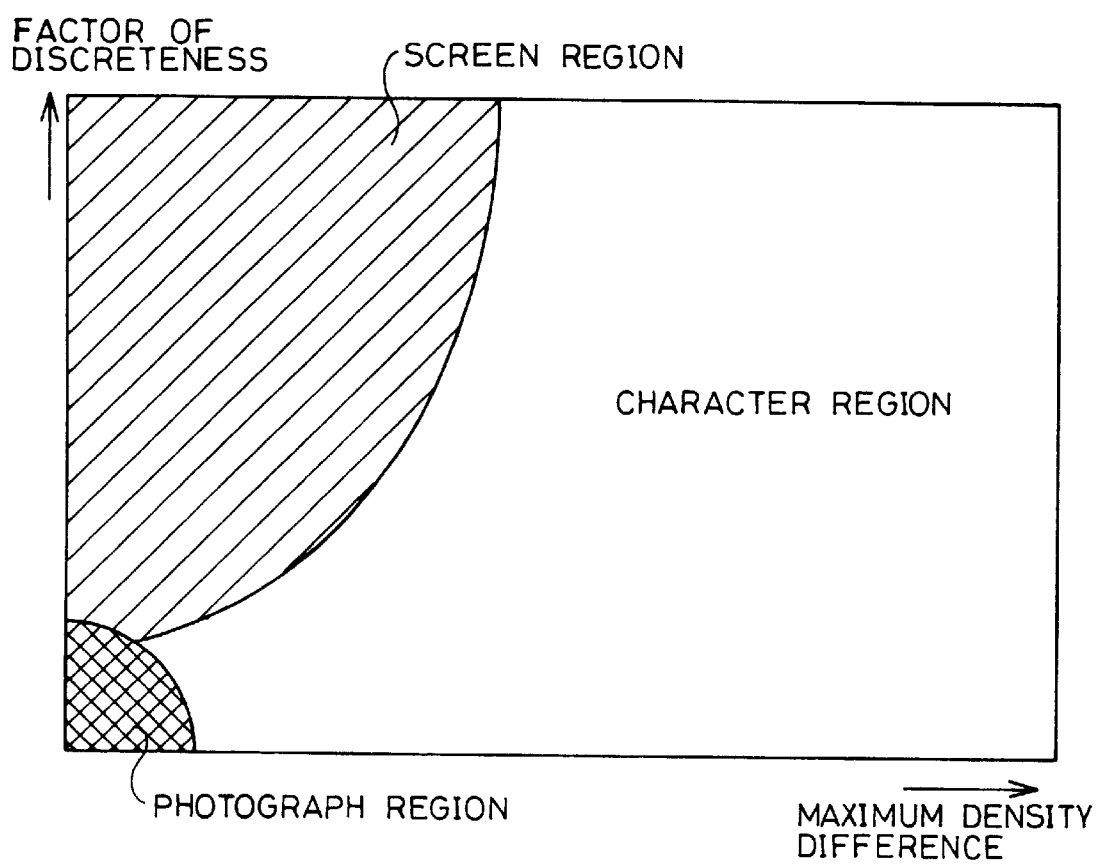
FIG. 7 is a graph showing a second order lookup table for use in computing the region decision value in the region decision value extracting section.

Then, based on the resulting maximum density value and the degree of discreteness of each pixel, it is determined which of the character region, the photographic region or the screen region, the target pixel belongs to in reference to. For example, a 2-dimensional lookup table of FIG. 7, the two-direction in which the x-axis shows the maximum density value and the y-axis shows the degree of discreteness.

In the secondary lookup table, the boundary line of each region is set beforehand in consideration of relationship between each feature amount and each region. Namely, the large maximum density value suggests that there is low probability that the target pixel belongs to the photographic region or the screen region of a continuous gray scale. The large degree of discreteness suggest that it is less likely that the target pixel belongs to the photographic region and is likely that it belong to the screen region.

For each pixel of the image data S3, a region decision value is computed as follows. That is, if the pixel belongs to the photographic region, the region decision value is determined to be "0". If the pixel belongs to the character region, the region decision value is determined to be "1", and if the pixel belongs to the screen region, the region decision value is determined to be "2". Then, the segmentation data "S12" composed of the region decision values of respective pixels are sent.

Based on the selection signal "S14" from the control section 12, the region decision value extracting section 6 determines if the output from the region decision value extracting section 6 is to be subjected to the conversion by the region decision value transforming section 7. Namely, when the selection signal "S14" is a signal "0" indicative of the pixel number increasing process, the region decision value extracting section 6 sends the segmentation data "S12" to the region decision value transforming section 7. Then, the segmentation data "S13" thus converted by the region decision value transforming section 7 are sent to the filtering section 5. On the other hand, when the selection signal "S14" is a signal "1" indicative of the pixel decreasing process, the segmentation data "S12" are sent directly to the filtering section 5 without applying the transformation by the region decision value transforming section 7.

With respect to the image data "DATA 3" or the image data "S5" as input, the pixel-number transforming section 4 applies a magnifying process of n times of the image on the image data, and then an interpolation or a decrimation is performed on a pixel so as to have an equal interval of a pixel, thereby multiplying the number of pixels by n. The pixel number transformation factor n is shown by the following formula:

$$n = Z \times R_{OUT}/R_{IN},$$

wherein n is a factor of pixel number transformation, Z is a factor of transformation, $R_{OUT}$ is a resolution of an image output, and $R_{IN}$ is a resolution of the image data.

The pixel-number transforming section 4 computes a position of each pixel after the pixel number transformation, and among the pixels after the pixel number transformation, the density of the interpolation pixel at position where the pixel does not exist in the original image data (S3 or S5) is computed from the pixel density of original image data (S3 or S5).

As can be seen from the equation, the pixel-number transforming section 4 performs the magnifying process and resolution transforming process using a common algorithm; however, relationship between the image data and the control clock of the image output device 14 differs between the magnifying process and the resolution transforming process. Namely, the control clock of the image output device 14 is altered according to the resolution $R_{OUT}$ of the output image but is not affected by the magnification factor Z.

For the method of computing the density of the interpolation pixel, the following interpolation methods may be adopted: a) nearest interpolation method wherein the density of the pixel nearest to the interpolation pixel on the original image data is determined to be the density of the interpolation pixel; b) the primary interpolation method (linear interpolation method) wherein the densities of a plurality of pixels close to the interpolation pixel on the original image data are weighted based on the distance from the interpolation pixel; and c) N-order interpolation method. Here, only the explanations on the primary interpolation method will be explained.

In the primary interpolation method, the density Q1 of the projection point Q1 and the density Q2 of the projection point Q2 are calculated by the following formulae:

$$Q1=(P1 \times b+P2 \times a)/(a+b)$$

$$Q2=(P3 \times b+P4 \times a)/(a+b).$$

Then, based on the resulting density values Q1 and Q2, the density R of the interpolation pixel R is computed by the following formula:

$$R=(Q1 \times d+Q2 \times c)/(c+d).$$

Figure 8:
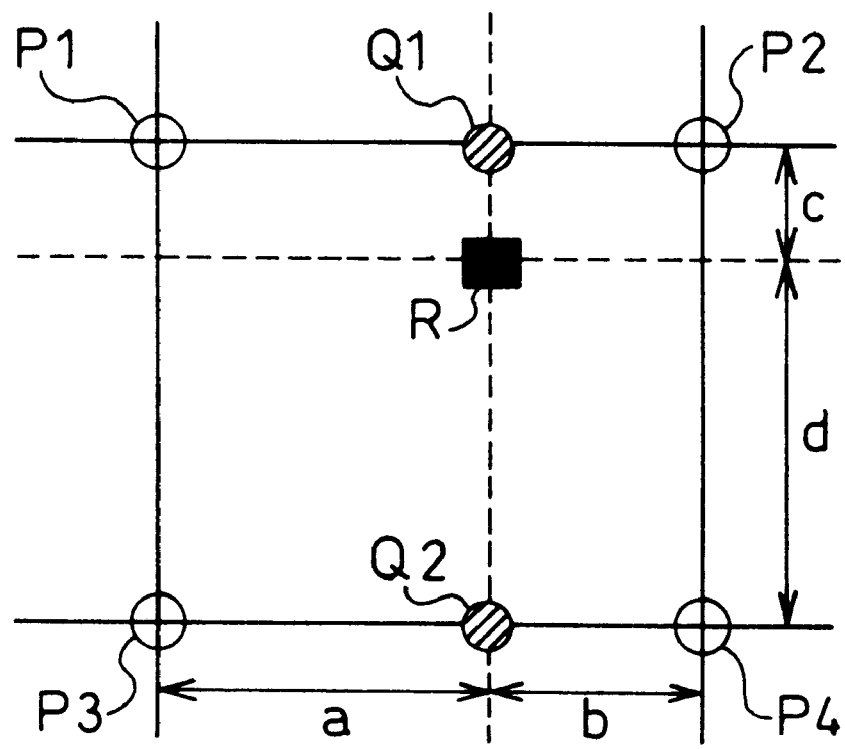
FIG. 8 is an explanatory view explaining the first order interpolation method for use in the pixel-number transforming section of the image processing apparatus.

In the above formulae, as shown in FIG. 8, "R" is the interpolation pixel, "P1" (density P1), "P2" (density P2), "P3" (density P3), and "P4" (density P4) are four target pixels (document reference points) on the adjoining image data (DATA 3 or DATA 5) in a vicinity of the interpolation pixel R, "Q1" is the projection point of the interpolation pixel R with respect the line connecting P3 and P4, "a" is a distance from the interpolation pixel R to the line connecting the pixel P1 and P3, "b" is a distance from the interpolation pixel R to the line connecting P2 and P4, "c" is the distance from the interpolation pixel R to the projection point Q1, and "d" is a distance from the interpolation pixel "R" to the projection point Q2.

The pixel-number transforming section 4 transmits the image data (S4 or S7) obtained by the pixel number transformation to the filtering section 5 or the γ-transformation section 8. Namely, when receiving the image data "S3" directly from the image data selecting section 3, the pixel-number transforming section 4 sends the image data "S4" after the pixel number transformation (increasing a pixel number) to the filtering section 5. On the other hand, upon receiving the filtered image data "S5" from the filtering section 5, the pixel-number transforming section 4 sends the image data "S7" after the pixel number transformation (pixel number reducing process) to the γ-transformation section 8.

Based on the region decision value of each pixel of the region identification data (S12 or S13), the image data (S3 or S4) as input are divided into a plurality of regions, and an appropriate filter is selected by altering only the weight of the filter for each region, and a smooth process or an enhancement is performed when necessary.

In the filtering process by the filtering section 5, the results of convolution calculation between the matrix composed of the density value of the target pixel of the image data and the pixel close to the target pixel and the filter that is the matrix of the weight factor is determined to be the density value of the target pixel.

For example, in the emphasizing filtering process adopting the filter F1 of 3×3 shown in FIG. 9(a), the result of the convolution calculation of (a) 3×3 matrix composed of the density value p5 and the density values of from p1 to p4, and from p6 to p9 of the image data and (b) filter shown in FIG. 9(b) is determined to be the density value of the target pixel. Accordingly, the density value p5 of the filtered target pixel is given by the following formula:

$$q5=\{(p1+p3+p7+p9) \times 0+(p2+p4+p6+p8) \times (-1/6)+p5 \times (10/6)\}.$$

As shown in FIG. 10, the filtering section 5 changes a filter to be used depending on the region decision value of each pixel of the region identification data (S12 or S13). Between the case where the image data "S4" after the pixel number transformation is input (pixel number increasing process), and the case where the image data "S3" is input (pixel number decreasing process), the filter to be used is altered.

In the case of performing the pixel number increasing process, based on the transformed segmentation data "S13", a filter to be adopted is selected in the following manner: For the region decision value "0" indicating that the target pixel belongs to the photographic region, a filter F2 for directly outputting an input value is selected; for the region decision value "1" indicating that the target pixel belongs to the photographic region, a filter F1 for emphasizing an edge of the character is selected to prevent a generation of a blurred character; and for the region decision value "2" indicating that the target pixel belongs to the screen region, a filter F2 is selected to output the input value without processing.

On the other hand, in the case of performing the pixel number decreasing process, based on the segmentation data "S12", a filter to be adopted is selected in the following manner: For the region decision value "0" indicating that the target pixel belongs to the photographic region, a filter F2 for directly outputting an input value is selected; for the region decision value "1" indicating that the target pixel belongs to the photographic region, a filter F1 for enhancing an edge of the character is selected to prevent a generation of a blurred character; and for the region decision value "2" indicating that the target pixel belongs to the screen region, a filter F4 is selected to apply a smoothing process. Therefore, with an application of the smoothing process, an occurrence of moire in the image of the screen region, which has been gone through the pixel number reducing process can be prevented.

The region decision value transforming section 7 is provided for transforming the region decision value of each pixel of the region identification data "S12" by interpolation or decrimation to compute the region decision value of each pixel of the image data (S4 or S7) of the pixel number after the transformation. The described region decision value transforming method is selected according to the kind of the region identification data "S12".

Namely, in the case where the region decision value of each pixel of the region identification data S12 suggests the likelihood that the target pixel belongs to each region, an interpolation of the region decision value is performed by the primary interpolation method or N-order interpolation method. In the case where the region decision value of each pixel of the region identification data S12 is a value specifying the region where the target pixel belongs to, an interpolation of the region decision value is performed by the nearest interpolation method.

The region decision value of each pixel of the region identification data S12 is "0", "1" or "2" specifying the region where the target pixel belongs to, the region decision value is transformed using the nearest interpolation method. The nearest interpolation method will be explained in detail in reference to FIG. 8. In the nearest interpolation method, among the pixels P1 through P4 of the document image indicative of the position in a vicinity of the interpolation pixel R, the region decision value of the pixel closest to the interpolation pixel R is determined to be the region decision value of the interpolation pixel R. Therefore, in an example shown in FIG. 8, the region decision value of P2 indicates the region decision value of the interpolation pixel R. Here, the method of performing the interpolation of the region decision value by the first order interpolation method or the Nth order interpolation method will be explained later.

Figure 12:
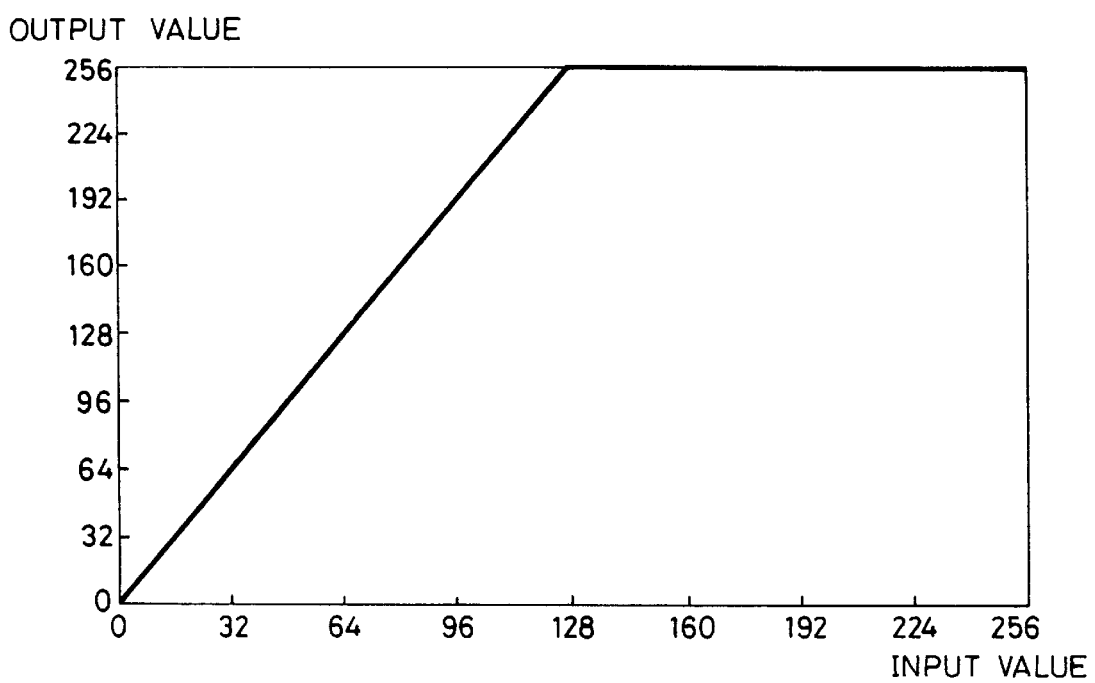
FIG. 12 is a graph showing a lookup-table of FIG. 11.

The γ-transformation section 8 is provided for segmenting the image data (S6 or S7) as input into a plurality of regions based on the region identification data S13 after the transformation to apply an optimal γ-transformation for each pixel by switching the lookup table. The γ-transformation section 8 performs a gray scale correction in consideration of the characteristics of the output apparatus and the following image processing to realize an output image of predetermined gray scale characteristics. For example, such output image can be achieved, for example, by the density transformation using the lookup table shown in FIG. 1. In the density transformation adopting the lookup table, the density value of the input image data (input value) is converted into the set value (output value) of an address (position) equivalent to the density value in the lookup table. The secondary order graph wherein an x-axis shows an address (input value), and a y-axis shows a set value of the address (output value) of the lookup table shown in FIG. 11 is shown in FIG. 12.

Figure 13:
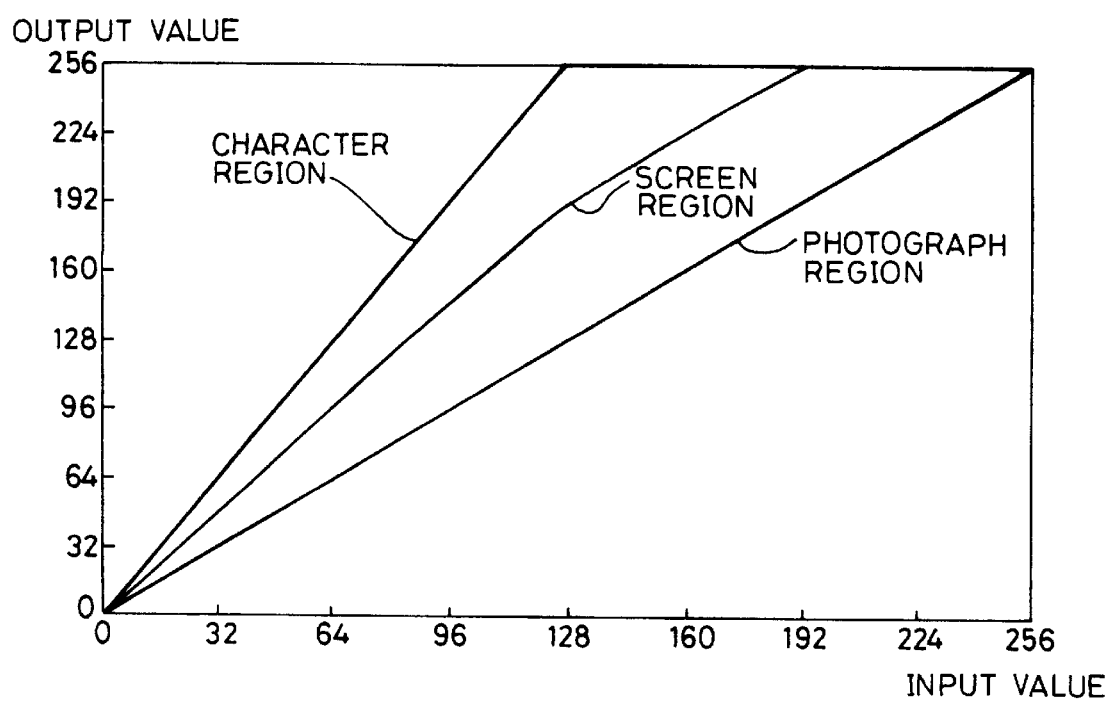
FIG. 13 is a graph showing a lookup-table for use in each region in the γ-transformation section of the image processing apparatus.

Based on the region decision value of each pixel of the image input device 13, the lookup table to be adopted for the γ-transformation for each pixel is switched to perform an optimal γ-transformation for each region. The graph of the lookup table for use in the γ-transformation of each region of the γ-transformation section 8 is shown in FIG. 13. From the graph of FIG. 13, γ characteristics of each region after the γ-transformation can be seen.

As can be seen from the graph of FIG. 13, the γ-transformation section 8 applies a γ-transformation to the pixel of the photographic region (the pixel having a region decision value "0") using the lookup table having the linear γ characteristics (γ=1). For the pixel of the character region (the region decision value is "1"), the γ-transformation section 8 performs a γ-transformation using the lookup table having a large γ. For the pixel of the screen region (region decision value is "2"), the γ-transformation is performed using the lookup table having intermediate γ-characteristics between those of the lookup table for the photographic region and those of the lookup table for the character region. As a result, a contrast of the screen region can be raised to some extent, and a still higher contrast of the photographic region than the screen region can be raised without varying a contrast of the photographic region.

The pseudo-halftone processing section 9 performs a pseudo-halftone processing with respect to the image data S8 as received from the γ-transformation section 8 using the transformed segmentation data "DATA 13". The method of the pseudo-halftone processing to be carried out by the pseudo-halftone processing section 9 may be the binary error diffusion method or a dither method. Here, explanations will be given through an example of the binary error diffusion method. Additionally, in the present embodiment, a pseudo-halftone processing is performed with respect to the image data of 256 gray scales; however, the number of gray scales of the image data to be processed by the pseudo-halftone processing is not particularly limited.

In the binary error diffusion method, first, the multi-density value B is classified into a quantization value LEV 0 (=1) which is larger than the threshold value THE and a quantization value LEV 1 (=0) which is smaller than the threshold value THE. Namely, the density value B of the target pixel B is compared with the threshold value THE, and if a condition of B>THE, the density B of the target pixel B is selected to be LEV 0, and if B<THE, the density B of the target pixel B is selected to be LEV 1.

Next, by setting the density B of the target pixel B to LEV 0 or LEV 1, an error to be generated is computed. Namely, the error to be generated by setting the density B of the target pixel B to LEV 0, the error ER 1 is given by the following equation:

$$ER\ 1 = B - LEV\ 0.$$

Further, by setting the error to be generated when setting the density B of the target pixel B to LEV 1 ER 2, the error ER2 is given by the following equation:

$$ER2 = B - LEV\ 1.$$

Figure 14:
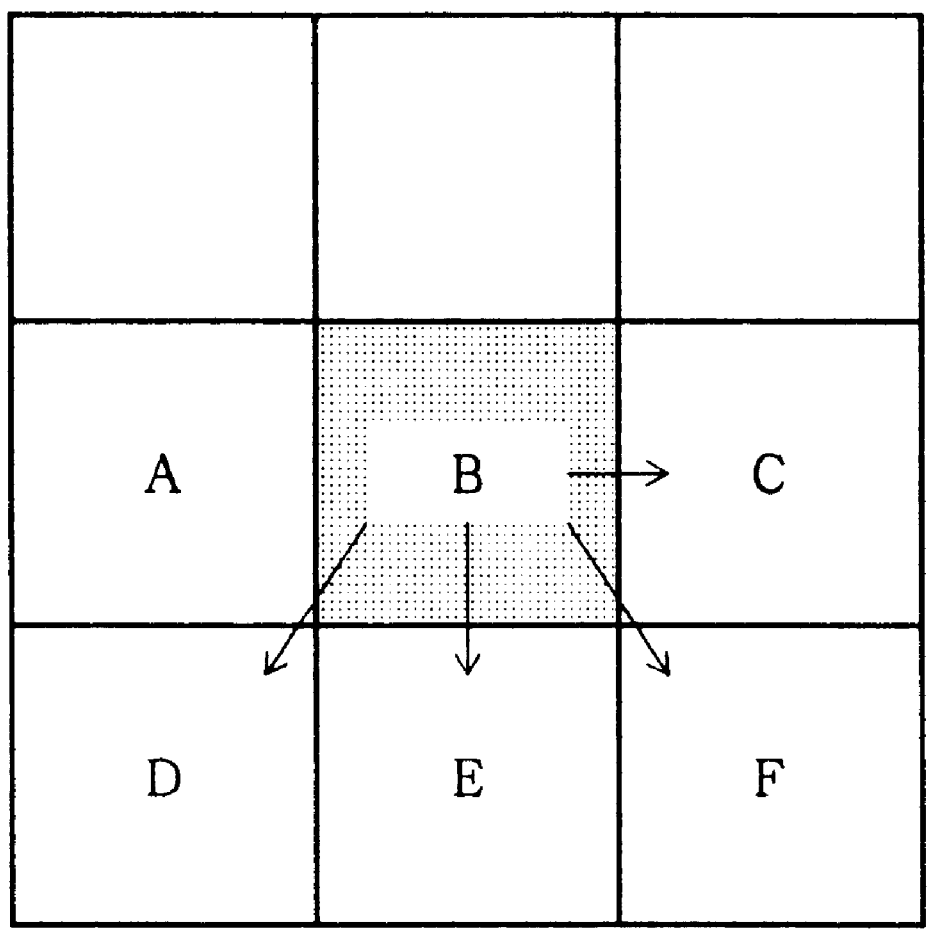
FIG. 14 is an explanatory view explaining a method of an error dispersion of a pseudo-halftone processing section of the image processing apparatus.

Then, the error ER1 or the error ER 2 is dispersed in a vicinity of pixels of the target pixel B. Namely, as shown in FIG. 14, the error ER 1 or error ER 2 is diffused in four directions, respective adjoining directions forming an angle of 45°. Further, a factor of diffusion is set for each of the four directions in which an error is to be diffused. Here, in order to uniformly diffuse the error ER 1 or the error ER 2 into four directions, the factor of diffusion in all directions is selected to be 1/4.

Respective amounts of errors to be dispersed from the target pixel B to four pixels C through F in a vicinity of the target pixel B be ERC, ERD, ERE and ERF, then the amounts of errors ERC, ERD, ERE and ERF can be given by the following formulae:

$$ERC = 1/4 \times ER1 \text{ or } 1/4 \times ER2;$$

$$ERD = 1/4 \times ER1 \text{ or } 1/4 \times ER2;$$

$$ERE = 1/4 \times ER1 \text{ or } 1/4 \times ER2;$$

and $$ERF = 1/4 \times ER1 \text{ or } 1/4 \times ER2.$$

Then, with respect to a density of each pixel C through F, an amount of error ERC to be diffused in each pixel C through F is added. By carrying out the process for each pixel, densities of all the pixels of the image data is represented by the binary value of LEV 0 or LEV 1.

The threshold value THE in the binary value error diffusion is selected as follows: For the photographic region, a set value THE=90 is selected indicating that a gray shade is valued. For the character region, the set value THE=128 is selected indicating that a linear reproducibility is valued is selected. For the screen region, the set value THE=110 between the set value THE=90 for the photographic region and the set value THE=128 for the character region is selected. By the described setting, an appropriate image can be obtained. Based on the region decision value for each pixel, by altering the threshold value of the binary error diffusion, a quality image can be obtained also for the pseudo-halftone processing.

The image editing section 10 is provided for applying an optimal editing of an image for each region by dividing the image data "S9" into a plurality of regions based on the transformed segmentation data "S13". The editing of an image by the image editing section 10 is not particularly limited. However, editing process will be given through the case of screening.

With respect to the binary image data "S9", the screening process by the image editing section 10 is performed based on the transformed region identification data S13 in such a manner that only the character region (region corresponding to the region decision value of "1") is screened, without processing the photographic region (the region corresponding to the region decision value of "0") and the screen region (the region corresponding to the region decision value of "2").

Figure 17A:
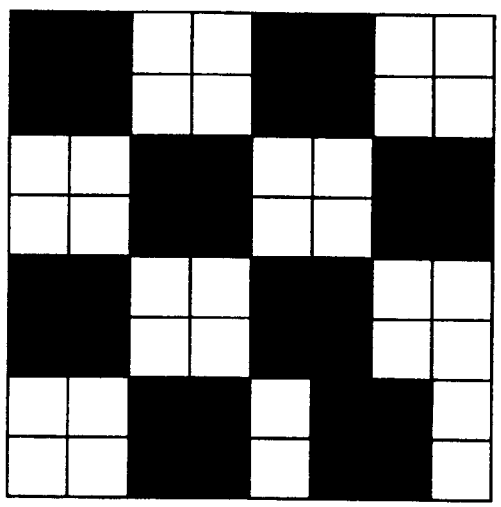
Figure 17B:
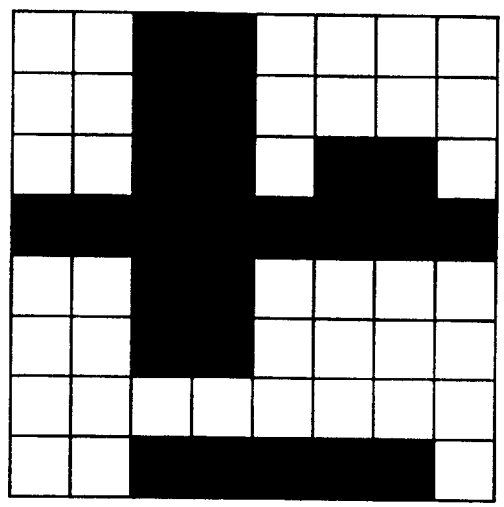
Figure 18:
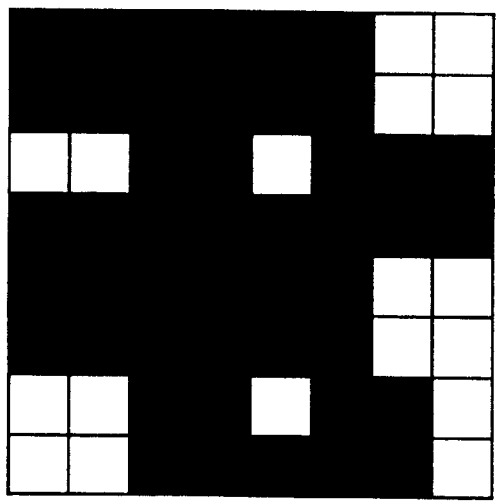
FIG. 18 is an explanatory view showing image data to be screen processed by the restoring section.

When applying a screening process to the binary image data "S9", an OR process is applied to the density value (binary) of each pixel of the screen processing pattern and a density value (binary value) of each pixel of the image data. Namely, the density value of the pixel having at least one of the described density values of "1" is determined to be "1", and the density value of the pixel having both of the described density values of "0" is determined to be "0". For example, by performing an OR process to the screen processing pattern shown in FIG. 17(*a*) and the binary image data shown in FIG. 17(*b*), the screened image data are obtained as shown in FIG. 18. The image editing section 10 alters the screening process according to the region decision value.

The quantization-restoring section 11 divides the binary image data S10 based on the transformed region identification data S13. Here, the binary image data S10 and performs an optimal binary restoring process to each region. Here, explanations will be given through an example of restoring the binary image data "S10" as binary error dispersed by the pseudo-halftone processing section 9 into a multi-value (256 value). However, the effects of the present invention can be achieved also when adopting other restoring methods.

Figure 15:
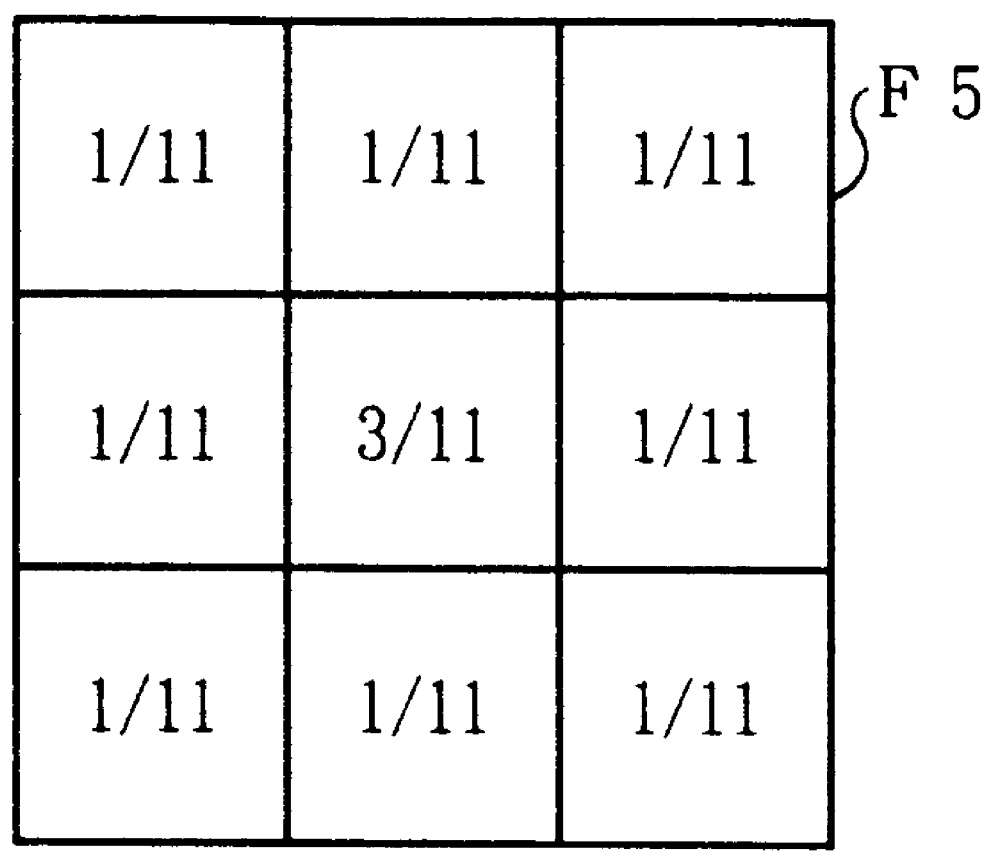

In the quantizing restoring process, the density value "0" and "1" in the binary image data are transformed into the density values "0" and "255". Next, with respect to the image data thus converted, the same filtering process as that of the aforementioned filtering process is performed suing the restoration filter shown in FIG. 15. The method of computing the density of the target pixel is the same as the filtering process by the filter processing section 5.

FIG. 16 shows a restoration filter in each region. For the pixel having the region decision value of "0", i.e., the pixel in the photographic region, the quantization-restoring section 11 performs a quantization restoring process using the smoothing filter F5 so as to obtain the density value of an intermediate tone based on the transformed segmentation data "S13". For the pixel having a density value of "1", i.e., the pixel in the character region, the quantization-restoring section 11 selects a filter F2 without making a change which causes a blurred character. For the pixel having the region decision value of "1", i.e., the pixel in the screen region, the quantization-restoring section 11 applies a quantizing restoration using a smoothing filter F4 having a lower degree of smoothness than that for the photographic region. In the described manner, quality quantizing restoration process is permitted.

As described, in the γ-transformation section 8, the pseudo-halftone processing section 9, the image editing section 10 and the quantization-restoring section 11, a processing of the image is performed based on the transformed region identification data S13, and the processed image data (any one of S8 to S11) are sent to the image output device 14.

In the described preferred embodiment, the image as read by the image input device 13 is a document image in which the character region, the photographic region and the screen region are mixed, and the region decision value extracting section 6 extracts the region decision value indicating whether the target pixel belongs to the character region, the photographic region or the screen region based on the region segmentation table on the difference in the maximum density value and the frequency. However, the method of extracting the region decision value in the region decision value extracting section 6 is not particularly limited.

For example, the region decision value extracting section 6 may extract probability that the target pixel belongs to the character region (character likelihood), the probability that the target pixel belongs to the photographic region (photographic likelihood), and the probability that the target pixel belongs to the screen region (screen likelihood).

Alternately, it may be arranged such that in the case where the image as read by the image input device 13 includes an edge region and a non-edge region, i.e., the document image including characters or line drawings, the region decision value extracting section 6 detects the edge region.

The region identification method is the edge detecting method adopting a sobel filter. Namely, an edge region is detected based on a sobel output as a result of convolution calculation of the matrix composed of the respective density values of the target pixel of the image data and the density value in the vicinity values in a vicinity of the pixels and the sobel filter (edge detection mask).

Figures 19A, 19B:
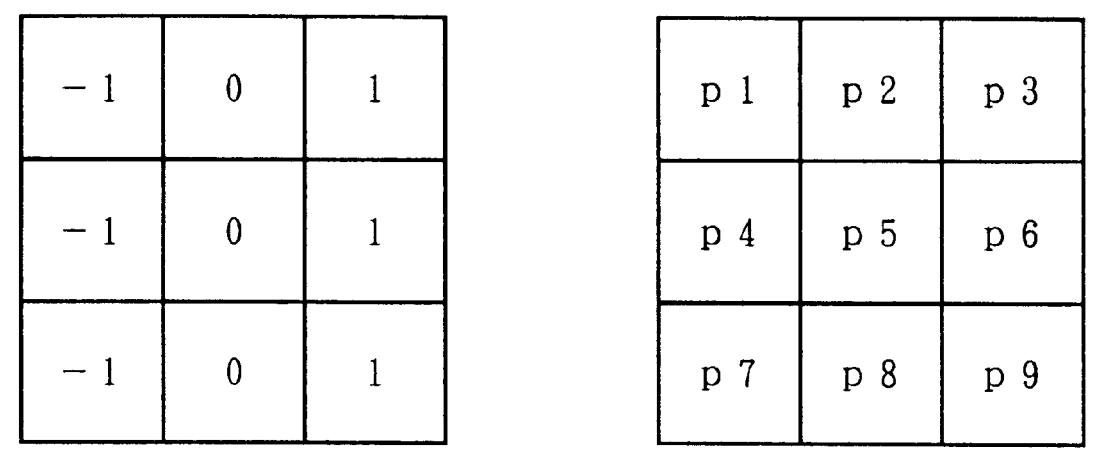

Specifically, a sobel output is calculated, for example, by a convolution of a sobel filter shown in FIG. 19(*a*) and 3×3 matrix composed of a density value p5 of the target pixel and the density values p1 through p4 of the pixels around the target pixel of the image data shown in FIG. 19(*b*). Therefore, the sobel output s is given by the following formula:

$$s=|p1+p3-p4+p6-p7+p9|.$$

Here, the target pixel is the pixel at the center of the 3×3 matrix shown in FIG. 19(*b*).

In this example, the larger is the sobel output, the higher is the degree of the edge (gradient), i.e., high possibility (probability) that the subjected region is the edge region. On the contrary, the smaller the sobel output, the lower the degree of the edge, i.e., the possibility (probability) that the subjected region is the edge region. Therefore, the sobel output can be used as the region decision value indicating the probability of the edge region. Further, by processing the sobel output s with the threshold value of several steps, a region decision value specifying each region can be obtained. Here, the resulting sobel output obtained by the sobel filter shown in FIG. 19(*a*) shows the edge gradient in the direction from the target pixel to the pixel of the density value p6 (to the right in FIG. 19(*b*)).

In the arrangement where the region decision value extracting section 6 extracts from the input image data, the region decision value indicating the probability that the target pixel belongs to each region, i.e., the region decision value representing the probability that the target pixel is in the edge region, the probability that the target pixel belongs to the character region (character likelihood), the probability that the target pixel belongs to the photographic region (photographic likelihood), and the likelihood where the target pixel belongs to the screen region (screen likelihood), it is preferable that the region decision value transforming section 7 performs the interpolation of the region decision value by the primary interpolation method or the Nth order interpolation method.

The primary interpolation method to be performed by the region decision value transforming section 7 is the same as the primary interpolation method adopted in the pixel-number transforming section 4 except for that the density value is replaced with the region decision value.

Figure 20:
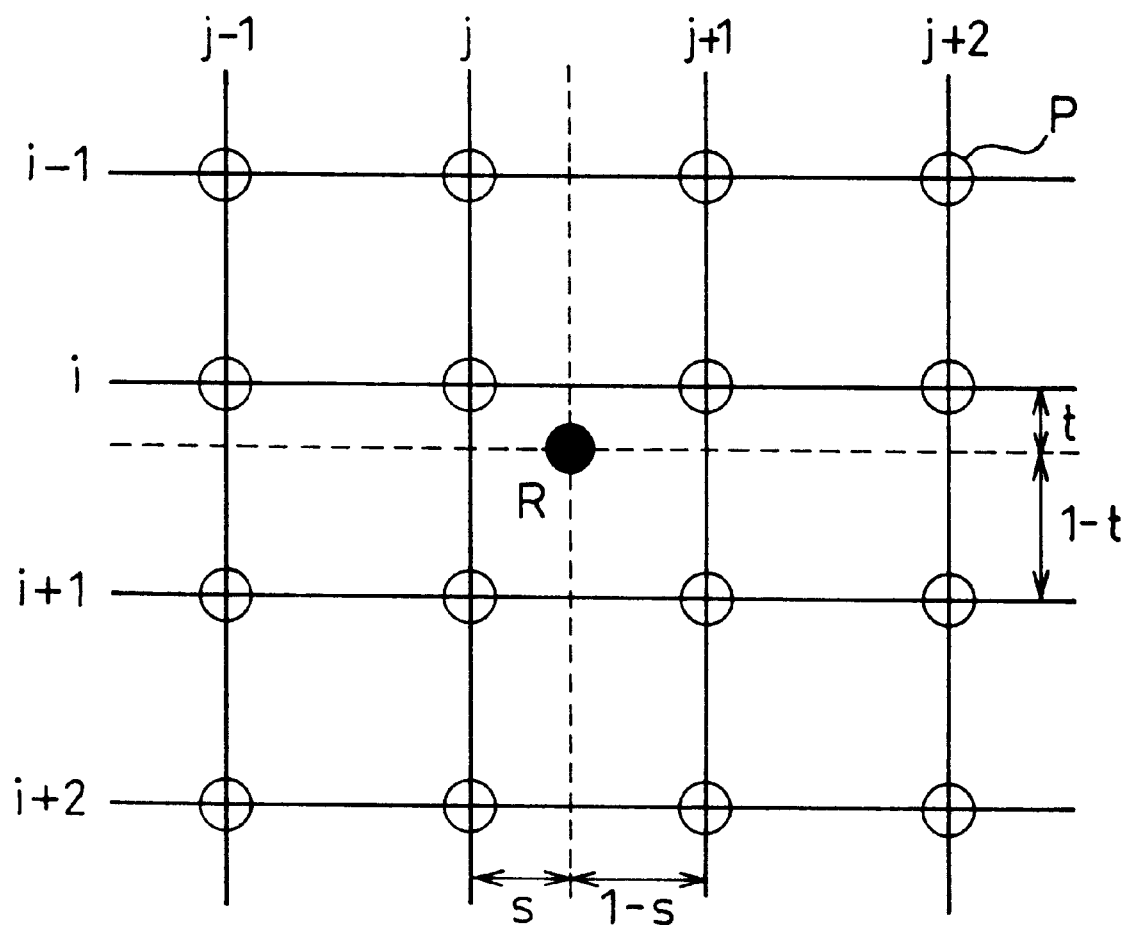
FIG. 20 is an explanatory view for explaining a third order interpolation for use in the region decision value extracting section of the image processing apparatus.

The Nth order interpolation method suggests not the linear interpolation among two to four pixels, but the integer order interpolation method in which an interpolation is performed using not less than the second order curved lines among at least 4 pixels. Here, an example will be given through an example of the third order interpolation method (sampling function interpolation method) in reference to FIG. 20.

Assumed that the region decision value of the interpolation pixel R be Rd, then the region decision value Rd of the interpolation pixel R by the third-order interpolation method can be obtained from the region decision values of 16 target pixels in a vicinity of the interpolation pixel by the following equation (5).

$$Rd = \sum_{m=i-1}^{i+2} \sum_{n=j-1}^{j+2} \{f(m,n) \times c(m+t) \times c(n+s)\} \quad (5)$$

In the equation (5), f (m, n) suggests the region decision value of the target pixel p located at the intersection between the line m and the line n, s is a distance between the line j and the interpolation pixel R, and t is a distance between the line i and the interpolation pixel R.

Additionally, the function c(X) is a function of a sampling value by a sampling theorem given by the following formula c(X):

$$c(X)=(1/\pi X)\times\sin \pi X.$$

Normally, the function c(X) is simplified by the third order approximation:

$$0 \leq |X| < 1, c(X)=1-2|X|^2+|X|^3$$

$$1 \leq |X| < 2, c(X)=4-8|X|+5|X|^2-|X|^3$$

$$2 \leq |X|, c(X)=0.$$

By adopting the described simplified formula, the third order interpolation method (target function) can be achieved.

The interpolation of the region decision value by the 3rd order interpolation method permits a smooth approximation like the analog function, it is suitably adopted in the case where the region decision value as extracted from the input image data indicates a value representing the probability that the target pixel belongs to each region.

Further, for the interpolation method of the region decision value, it is preferable that the region decision value transforming section 7 performs the same interpolation method of the image data (density value) in the pixel-number transforming section 4 as the interpolation method of the region decision value. As a result, a gradient of the region decision value corresponding to the density gradient of the image data can be realized, thereby achieving a still improved image quality.

Figure 21:
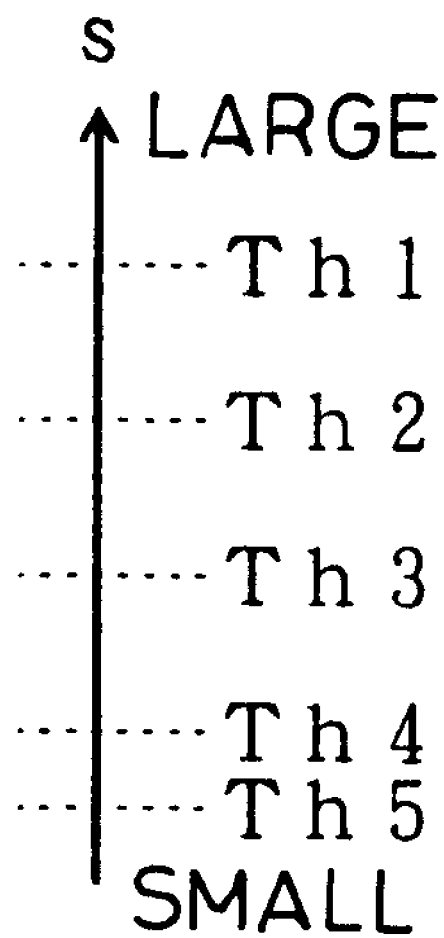
FIG. 21 is an explanatory view showing a correlation of five threshold values for use in sober output region segmentation.

In the arrangement where the region decision value extracting section 6 extracts the sobel output (sober result output value) "s" indicating the probability that the target pixel belongs to the edge region, an optical image processing for each region is based on the results computed by the sobel filter in the following manner:

Here, the explanations will be given through the case where the sobel output "s" is processed with five threshold values Th1, Th2, Th3, Th4 and Th5. These threshold values satisfy the following inequality as shown in FIG. 21.

Th1>Th2>Th3>Th4>Th5.

By processing the sobel output "s" with five threshold values Th1, Th2, Th3, Th4 and Th5, an image is segmented into 6 regions specifically as follows:

Th1<s, region 0 (region decision value "0");

Th2<s≦Th1, region 1 (region decision value "1")

Th3<s≦Th2, region 2 (region decision value "2");

Th3<s≦Th3, region 3 (region decision value "4"); and s ≦Th5, region 5 (region decision value "5")

Based on the region segmented by the comparison with the threshold value, the filtering section 5 alters a filter coefficient, and applies an optimal image processing for each region in such a manner that the filter coefficient shown in FIG. 22(a) is selected for the region "0", the filter coefficient shown in FIG. 22(b) is selected for the region "1", the filter coefficient shown in FIG. 22(c) is selected for the region "2", the filter coefficient shown in FIG. 22(d) i s selected for the region "3", and the filter coefficient shown in FIG. 22(e) is selected for the region "4", and the filter coefficient shown in FIG. 22(f) is selected for the region "5". By the described filtering process, an optimal image processing can be performed for each region.

The image processing to be carried out after the filtering process is the same as the image processing to be carried out based on the result obtained by the region segmentation based on the maximum density difference and the frequency. The relationship between the result of the region segmentation based on the maximum density difference and the frequency and the result of the sobel output are as follows: regions "0" and "1" correspond to the character region, and the regions "2", "3" and "4" correspond to screen regions, and the region "4" corresponds to a photographic region.

The image processing apparatus 1 of the present embodiment is arranged so as to send the output image data (any of S8 to S11) to the image output device 14. However, the image processing device of the present invention may be arranged so as to transfer the image data output to the memory to be stored therein. In this case, the image can be output by outputting the image data as read from the memory to the image output device 14.

The image processing apparatus 1 of the present embodiment is separately provided from the image input device 13 and the image output device 14. However, the image processing apparatus of the present invention may be arranged so as to store therein the image input device 13 and the image output device 14. Namely, the image processing apparatus of the present invention may be a facsimile machine provided with an image processing section having the same functions as the image processing apparatus 1 and the image input device 13, or digital copying machine, etc., provided with an image processing section having the same function as the image processing apparatus 1, the image input device 13 and the image output device 14.

The first image processing apparatus of the present invention is characterized by including: pixel number transforming means for processing input image data composed of a plurality of regions each being represented by a plurality of pixel with a pixel number transformation by performing an interpolation or a decrimation on a pixel; region decision value extraction means for extracting a region decision value of a region a target pixel belongs to based on characteristic amounts representing characteristics of a block composed of the target pixel and a plurality of pixels around the target pixel, each pixel of the image data being considered to be the target pixel; region segmentation image processing means for segmenting image data into a plurality of regions based on the region decision value of each pixel of the image data to process the image data for each region; and region decision value transforming means for calculating a region decision value of each pixel processed with the pixel number transforming process by performing an interpolation or a decrimation of the region decision value as extracted from the input image data.

According to the described arrangement of the first image processing apparatus of the present invention, the region decision value transforming means applies an interpolation or a decrimation of the region decision value as extracted from the input image data by the region decision value extraction means, to obtain the region decision value of each pixel of the input image data processed with the pixel number transformation. As this permits the region segmentation image processing means to segment the image data as processed with the pixel number transformation with high precision, an optimal image process can be applied for each region (for example, filtering process, $\ominus$-transformation, pseudo-halftone process, editing process and quantization-restoring process, etc.). Therefore, an improved quality of the image processed with the pixel number transformation can be achieved.

The second image processing apparatus of the present invention based on the first image processing apparatus is characterized in that the region segmentation image processing means is a region segmentation filter for segmenting the image data into a plurality of regions based on a region decision value of each pixel of the image data to apply a filtering process for each region.

According to the described arrangement, by carrying out the filtering process by segmenting respective pixels of the image data processed with the pixel number transformation, the filtering process which offers optimal characteristics and effects can be applied for each region of the image data, thereby achieving an improved quality of the filtered image after the pixel number transforming process has been applied. Especially, by applying an enhancement filtering process to the character region of the image data after the pixel number increasing process has been applied, the pixel number transforming process can be applied without degrading an image quality, and a high quality pixel number transforming process which cannot be realized with the conventional techniques can be realized.

The third image processing apparatus based on the second image processing apparatus is characterized by including a controller for controlling said region segmentation filter such that when a pixel number transforming process to be applied is a pixel number reducing process, a filtering process is applied before the pixel number reducing process is applied. Further, when a pixel number transforming process to be applied is a pixel number increasing process, a filtering process is applied before the pixel number reducing process is applied.

According to the described arrangement, when processing the image data with the pixel number reducing process for a reduction in size of the image, etc., a filtering process is applied before the pixel number reducing process is applied. On the other hand, when processing the image data with the pixel number increasing process for a increase in size of the image, etc., a filtering process is applied after the pixel number increasing process is applied.

When applying the pixel number reducing process to the image data, generally, moire is generated in the screen region of the image data as being affected by the relationship between the reduction rate of the pixel number and the periodicity of the screen region. However, the described arrangement offers a solution to the problem of generating moire in the screen region by controlling the periodicity of the screen region with the filtering process before applying the pixel number reducing process of the image data.

Additionally, when applying the pixel number increasing process to the image data, an image quality deteriorates due to the blurred character. However, the described arrangement prevents such problem by applying the enhancement filtering process to the image data after the pixel number increasing process is applied. As described, by switching the order of performing the pixel number transforming process and the filtering process between the pixel number increasing process and the pixel number reducing process, both the generation of moire and the deterioration of the image quality by the blurred character can be solved.

The fourth image processing apparatus of the present invention based on any one of the first through third image processing apparatuses is characterized in that the region decision value transforming device performs an interpolation of the region decision value by the primary interpolation method or the Nth order interpolation method when the region decision value as extracted from the input image data is a value representing the probability that the target pixel belongs to each region.

According to the described arrangement, as the region decision value can be transformed to have a smooth gradient according to the density gradient of the image data processed with the pixel number transformation, a still improved quality of the image processed with the pixel number transformation can be achieved.

The fifth image processing apparatus of the present invention based on any one of the first through third image processing apparatuses is characterized in that the region decision value transforming device performs an interpolation of the region decision value by the nearest neighborhood method.

According to the described arrangement, since the region decision value after the transformation specifies the region the target pixel belongs to, a still improved quality of the image processed with the pixel number transformation can be achieved.

The image processing apparatus of the present invention can be applied to the input image data as read of the image composed of a plurality of regions which can be segmented, such as a document image of a mixture of a character region, a photographic region and a screen region, a document image having an edge region and a non-edge region (namely, a document image including characters or line images, etc.)

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An image processing apparatus, comprising:
   pixel number transforming means for processing input image data composed of a plurality of regions, each region including a plurality of pixels with a pixel number transformation, by performing an interpolation on a pixel;
   region decision value extraction means for extracting a region decision value of a region that a target pixel belongs, based on characteristic amounts representing characteristics of a block including the target pixel and a plurality of pixels around the target pixel, each pixel of the image data being separately considered as the target pixel;
   control means for controlling whether a filtering process is to be applied to a region before or after a pixel number transformation of the region, dependent upon the pixel number transformation of the region increasing or reducing the number of pixels in the region; and
   region decision value transforming means for calculating a region decision value of each pixel processed with the pixel number transformation, by an interpolation of the region decision value extracted from the input image data.

2. The image processing apparatus as set forth in claim 1, further comprising:
   region segmentation image processing means for segmenting image data into a plurality of regions based on the region decision value of each pixel of the image data, to image process each region.

3. The image processing apparatus as set forth in claim 1, wherein:
   said region decision value extraction means extracts the region decision value of the region that the target pixel belongs to, using a region segmentation table having two input parameters of characteristic amounts of a maximum density difference and a degree of discreteness in the block.

4. The image processing apparatus as set forth in claim 2, wherein:
   said region segmentation image processing means includes a region segmentation filter for segmenting the image data into a plurality of regions based on the region decision value of each pixel of the image data, to apply a filtering process to each region.

5. The image processing apparatus as set forth in claim 4, wherein:
   said region segmentation filtering means processes a character region of the image data with an enhancement filtering process, by increasing a number of pixels.

6. The image processing apparatus as set forth in claim 4, wherein,
   the control means controls the region segmentation filter such that when a pixel number transformation to be applied to a region is a pixel number reducing process, the filtering process is applied to the region before the pixel number reducing process is applied.

7. The image processing apparatus as set forth in claim 4, wherein,
   the control means controls the region segmentation filter such that when a pixel number transformation to be applied to a region is a pixel number increasing process, the filtering process is applied to the region after the pixel number increasing process is applied.

8. The image processing apparatus as set forth in claim 1, wherein:
   when the region decision value, as extracted from the input image data, indicates a probability that the target pixel belongs to each region, said region decision value transforming means performs an interpolation of the region decision value by one of a primary interpolation method and an Nth order interpolation method.

9. The image processing apparatus as set forth in claim 1, wherein:
   when the region decision value, as extracted from the input image data, specifies a region that the target pixel belongs to, said region decision value transforming means performs the interpolation of the region decision value by a nearest interpolation method.

10. The image processing apparatus as set forth in claim 4, wherein:
    said region segmentation image processing means further includes a γ-transformation section for applying a γ-transforming process to the image data processed with the pixel number transforming process and the filtering process, based on the region decision value.

11. The image processing apparatus as set forth in claim 10, wherein:
    said region segmentation image processing means further includes a pseudo-halftone processing section for applying a pseudo-halftone process to the image data to which the γ-transforming process has been applied by said γ-transformation section using the region decision value.

12. The image processing apparatus as set forth in claim 11, wherein:
    said region segmentation image processing means further includes an image editing section for applying an image editing process to the image data processed with the pseudo-halftone process by said pseudo-halftone processing section using the region decision value.

13. The image processing apparatus as set forth in claim 11, wherein:
    said region segmentation image processing means further includes a quantization-restoring section for restoring the image data processed with the pseudo-halftone process by said pseudo-halftone processing section using the region decision value.

14. The image processing apparatus as set forth in claim 3, wherein:
    said region decision value extraction means computes a difference in density between pixels with respect to each combination of two adjacent pixels in a predetermined direction in a block composed of a target pixel and adjacent pixels, and computes a sum of the differences in the predetermined direction, and carries out these operations in each of a plurality of directions, thereby obtaining a minimum value among the resulting values as a degree of discreteness.

15. The image processing apparatus as set forth in claim 14, wherein:
    the plurality of said directions are different from one another by 45°.

16. The image processing apparatus as set forth in claim 1, wherein,
    the control means controls a region segmentation filter such that when a pixel number transformation to be applied to a region is a pixel number reducing process, the filtering process is applied to the region before the pixel number reducing process is applied.

17. The image processing apparatus as set forth in claim 1, wherein, the control means controls a region segmentation filter such that when a pixel number transformation to be applied to a region is a pixel number increasing process, the filtering process is applied to the region after the pixel number increasing process is applied.

18. The image processing apparatus as set forth in claim 16, wherein, the control means controls a region segmentation filter such that when a pixel number transformation to be applied to a region is a pixel number increasing process, the filtering process is applied to the region after the pixel number increasing process is applied.

19. An image processing apparatus, comprising:

pixel number transforming means for processing input image data composed of a plurality of regions, each region including a plurality of pixels with a pixel number transformation, by performing an interpolation on a pixel;

region decision value extraction means for extracting a region decision value of a region that a target pixel belongs to with a region segmentation table having input parameters of characteristic amounts of a maximum density difference and a degree of discreteness in a block that includes the target pixel and surrounding pixels;

control means for controlling whether a filtering process is to be applied to a region before or after a pixel number transformation of the region, dependent upon the pixel number transformation of the region increasing or reducing the number of pixels in the region; and region decision value transforming means for calculating a region decision value of each pixel processed with the pixel number transformation.

20. An image processing apparatus, comprising:

pixel number transforming means for processing input image data composed of a plurality of regions, each region including a plurality of pixels with a pixel number transformation, by performing an interpolation on a pixel;

region decision value extraction means for extracting a region decision value of a region that a target pixel belongs to with a region segmentation table having input parameters of characteristic amounts of a maximum density difference and a degree of discreteness in a block that includes the target pixel and surrounding pixels;

control means for controlling whether a filtering process is to be applied to a region before or after a pixel number transformation of the region, dependent upon the pixel number transformation of the region increasing or reducing the number of pixels in the region; and region decision value transforming means for calculating a region decision value of each pixel processed with the pixel number transformation, wherein when the extracted region decision value indicates a probability that the target pixel belongs to each region, said region decision value transforming means performs an interpolation of the region decision value by one of a primary interpolation method and an Nth order interpolation method.

21. An image processing apparatus, comprising:

pixel number transforming means for processing input image data composed of a plurality of regions, each region including a plurality of pixels with a pixel number transformation, by performing an interpolation on a pixel;

region decision value extraction means for extracting a region decision value of a region that a target pixel belongs to with a region segmentation table having input parameters of characteristic amounts of a maximum density difference and a degree of discreteness in a block that includes the target pixel and surrounding pixels;

control means for controlling whether a filtering process is to be applied to a region before or after a pixel number transformation of the region, dependent upon the pixel number transformation of the region increasing or reducing the number of pixels in the region; and region decision value transforming means for calculating a region decision value of each pixel processed with the pixel number transformation, wherein said region decision value extraction means computes a difference in density between pixels with respect to each combination of two adjacent pixels in a predetermined direction in a block composed of a target pixel and adjacent pixels, and computes a sum of the differences in the predetermined direction, and carries out these operations in each of a plurality of directions, thereby obtaining a minimum value among the resulting values as a degree of discreteness.

22. An image processing apparatus, comprising:

pixel number transforming means for processing input image data composed of a plurality of regions, each region including a plurality of pixels with a pixel number transformation, by performing an interpolation on a pixel;

region decision value extraction means for extracting a region decision value of a region that a target pixel belongs to with a region segmentation table having input parameters of characteristic amounts of a maximum density difference and a degree of discreteness in a block that includes the target pixel and surrounding pixels;

control means for controlling whether a filtering process is to be applied to a region before or after pixel number transformation processing of the region, wherein, when a pixel number transformation to be applied to a region is a pixel number reducing process, the filtering process is applied before the pixel number reducing process is applied to the region, and vice versa, if a pixel number increasing process is applied; and region decision value transforming means for calculating a region decision value of each pixel processed with the pixel number transformation.

23. A method of image processing, comprising:

processing input image data composed of a plurality of regions, each region including a plurality of pixels with a pixel number transformation, by performing an interpolation on a pixel;

extracting a region decision value of a region that a target pixel belongs, based on characteristic amounts representing characteristics of a block including the target pixel and a plurality of pixels around the target pixel, each pixel of the image data being separately considered as the target pixel;

controlling whether a filtering process is to be applied to a region before or after a pixel number transformation of the region, dependent upon the pixel number transformation of the region increasing or reducing the number of pixels in the region; and calculating a region decision value of each pixel processed with the pixel number transformation, by an interpolation of the region decision value extracted from the input image data.

24. A method of image processing, comprising:

processing input image data composed of a plurality of regions, each region including a plurality of pixels with a pixel number transformation, by performing an interpolation on a pixel;

extracting a region decision value of a region that a target pixel belongs to with a region segmentation table having input parameters of characteristic amounts of a maximum density difference and a degree of discreteness in a block that includes the target pixel and surrounding pixels;

controlling whether a filtering process is to be applied to a region before or after a pixel number transformation of the region, dependent upon the pixel number transformation of the region increasing or reducing the number of pixels in the region; and calculating a region decision value of each pixel processed with the pixel number transformation.

25. A method of image processing, comprising:

processing input image data composed of a plurality of regions, each region including a plurality of pixels with a pixel number transformation, by performing an interpolation on a pixel;

extracting a region decision value of a region that a target pixel belongs to with a region segmentation table having input parameters of characteristic amounts of a maximum density difference and a degree of discreteness in a block that includes the target pixel and surrounding pixels;

controlling whether a filtering process is to be applied to a region before or after pixel number transformation processing of the region, wherein, when the pixel number transformation process to be applied to a region is a pixel number reducing process, the filtering process is performed prior to the pixel number reducing process, and vice versa if a pixel number increasing process is applied; and calculating a region decision value of each pixel processed with the pixel number transformation.

* * * * *